July 23, 1940.  V. C. BOX  2,208,570
COTTON PICKER
Filed Jan. 26, 1939   3 Sheets-Sheet 1

Inventor
V. C. Box
By L. F. Randolph
Attorney

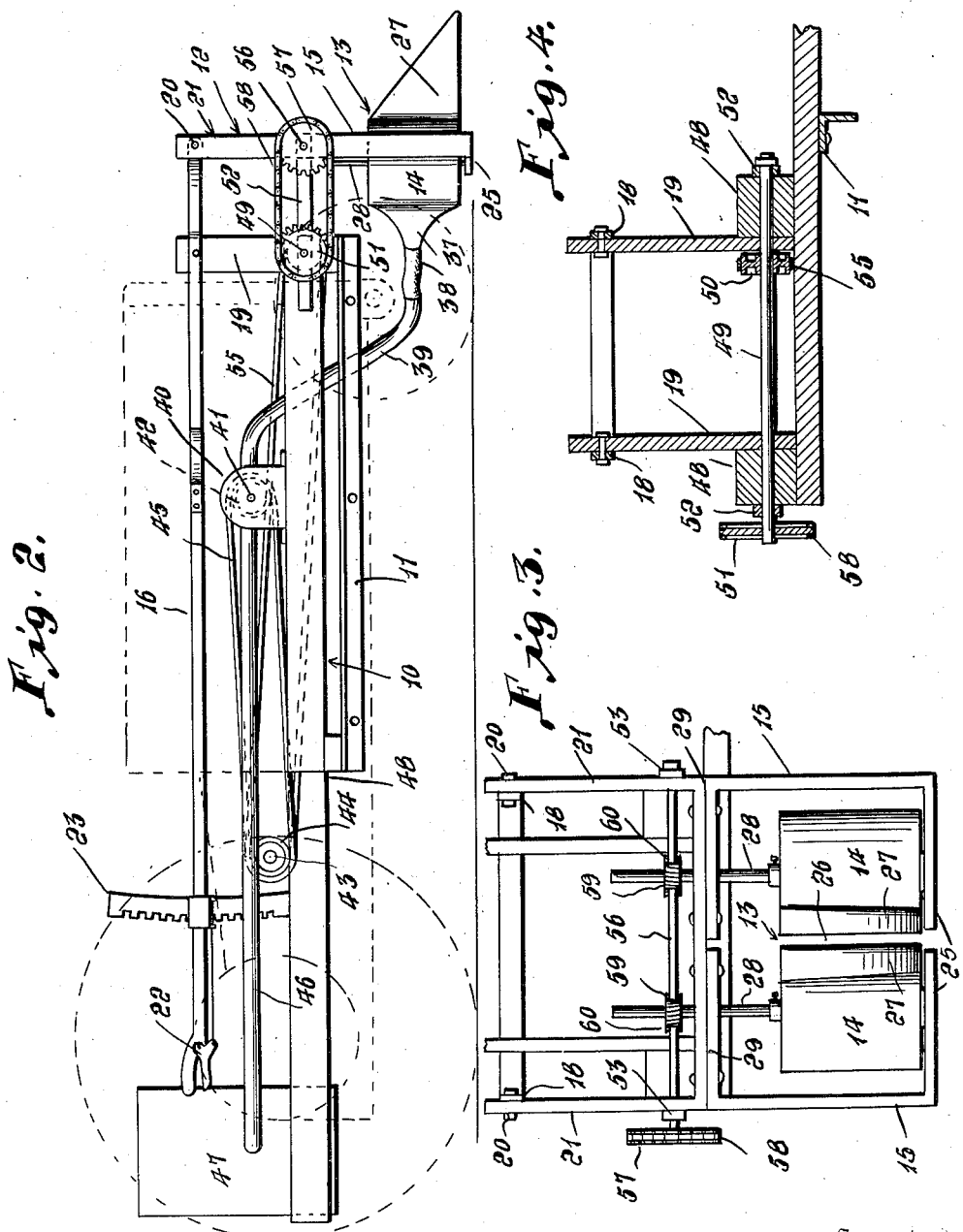

July 23, 1940.  V. C. BOX  2,208,570
COTTON PICKER
Filed Jan. 26, 1939  3 Sheets-Sheet 3

Inventor
V. C. Box
By L. F. Randolph
Attorney

Patented July 23, 1940

2,208,570

UNITED STATES PATENT OFFICE 2,208,570

COTTON PICKER

Virgil C. Box, McKinney, Tex.

Application January 26, 1939, Serial No. 253,001

11 Claims. (Cl. 56—40)

This invention relates to an improved cotton picker provided with a supporting frame adapted to be mounted as an attachment on a tractor or other motor driven vehicle to be driven by a power take-off from the motor of its supporting vehicle.

It is a primary object of this invention to provide a cotton picking machine constructed and operated in a manner to take advantage of the natural manner in which the cotton plant disperses its seed by means of either a barb or wind so that the lint in the open boll of the plant may be removed without injuring the growing plant or the unopened bolls to thereby thin out the plant in a manner similar to the conventional hand picking process.

It is an aim of this invention to provide gangs of rotatably mounted toothed picking members which are revolved in the same direction for engaging opposite sides of growing plants for removing the fibrous lint of the open boll, and suction means for maintaining a constant circulation of air between the picking disks to remove the lint therefrom and to convey it to a suitable storing container.

More particularly, it is an aim of this invention to provide gangs of rotatably mounted disks disposed in spaced apart relationship to allow cotton plants to pass therebetween, and means disposed between the disk of each gang for protecting the limbs of the plants from the barbed peripheries of the picking disks.

Still another object of the invention is to provide means forming a part of the picking gang for agitating the plant while the cotton is being picked therefrom and for turning the plant sufficiently to bring all of the open bolls into position to be contacted by the picking elements.

This picking machine is adapted to be used as an attachment for tractors and other motor driven vehicles and to be operated by a power take-off means from the motor thereof, and includes a frame for supporting the picking gangs and a casing which substantially encloses the gangs and is connected to the suction end of a blower for withdrawing the lint from the picking elements.

Figure 1:
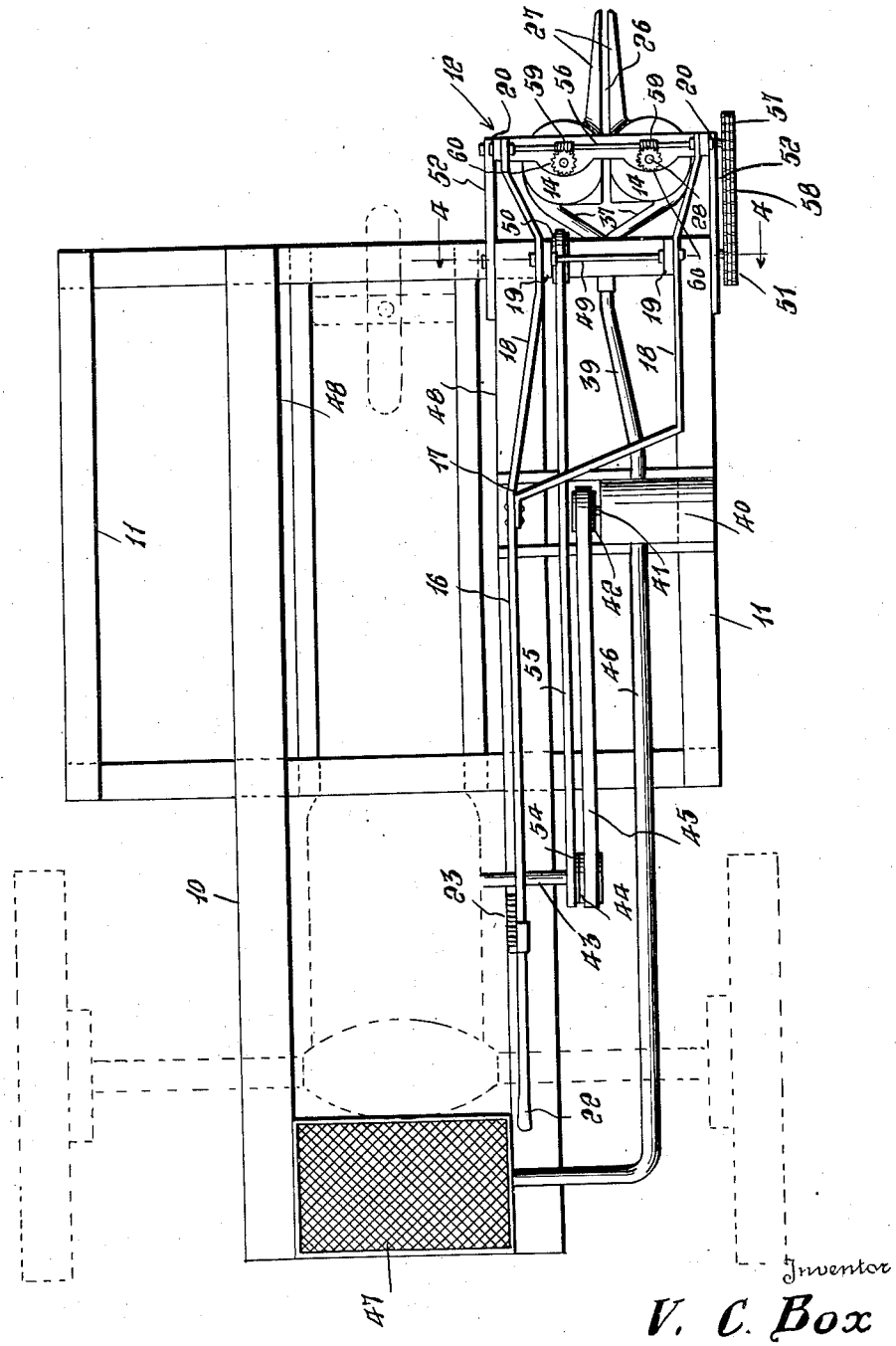
Figure 5:
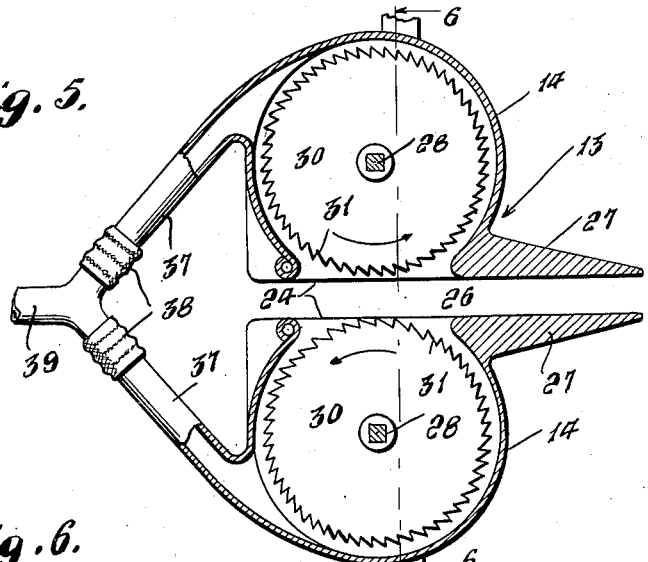
Figure 6:
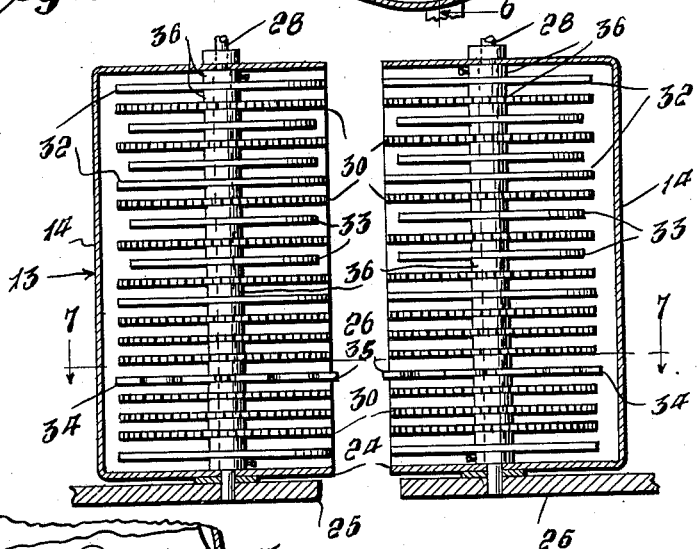
Figure 7:
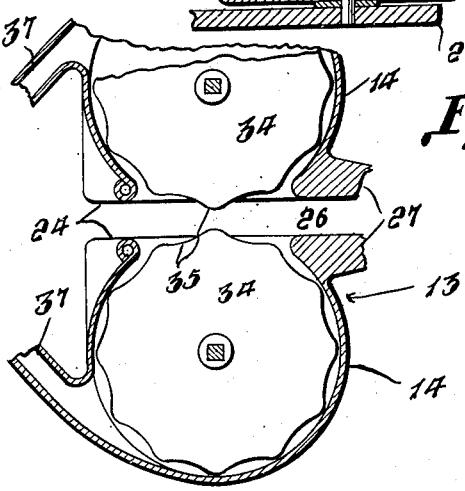

Other objects and advantages of the invention will hereinafter become more fully apparent from the following description of the drawings, which illustrate a preferred embodiment thereof, and wherein:

Figure 1 is a top plan view showing the attachment mounted on a conventional tractor, Figure 2 is a side elevational view of the same, Figure 3 is a front elevational view of the attachment, Figure 4 is a vertical sectional view taken along the line 4—4 of Figure 1, Figure 5 is a horizontal sectional view, on an enlarged scale, of the casing which contains the cotton picking gangs showing two of the opposed cotton picking disks in plan, Figure 6 is a vertical sectional view taken along the line 6—6 of Figure 5, and Figure 7 is a horizontal sectional view taken along the line 7—7 of Figure 6.

Referring more particularly to the drawings, wherein like reference characters designate like or corresponding parts throughout the different views, 10 designates generally a tractor of conventional construction on the side sills of which are adapted to be supported the outwardly projecting frames 11 which are disposed adjacent the forward end of the tractor 10. On one of the frames 11 is mounted the cotton picking attachment, comprising this invention, and designated generally 12 which is adapted to move along one row of cotton for picking the lint from the open bolls of the plants thereof. Obviously, a second attachment 12 could be mounted on the other frame 11 at the opposite side of the tractor 10 so that the device could function for picking two rows of cotton simultaneously as the tractor moves through a field.

The attachment 12 includes a casing designated generally 13 comprising corresponding sections 14 which are supported by the frame 15 in a vertical position. Lever 16 has a bifurcated end 17 the legs 18 of which are pivotally connected intermediate of their ends to the standards 19 which project upwardly from the forward end of the frame 11. The free ends of the legs 18 are pivotally connected at 20 to the upwardly extending spaced ends 21 of the frame 15. The opposite end of the lever 16 is provided with a conventional manually operated latch 22 which is adapted to engage the toothed stationary latch bar 23 for retaining the lever 16 in an adjusted position.

Referring particularly to Figures 5, 6 and 7, the sections 14 of the casing 13 are each arcuately shaped in cross section, as seen in Figure 5, and are open on their inner sides at 24 and are supported by the inturned ends 25 of the frame 15, which as seen in Figure 6, terminate in spaced apart relationship to each other and directly beneath the open sides of the sections 14 to form a vertically disposed passage 26 for a purpose which will hereinafter be described. The forward vertical free edges of the casing sections 14 terminate in the integrally formed forwardly projecting tapered guide fingers 27 which are spaced apart and which are vertically disposed to define the forward end of the passage 26. A shaft or spindle 28 is journaled longitudinally and centrally of each of the sections 14 with its lower end extending through and journaled in an end 25 of the frame 15 and with its upper end extending through and being journaled in the intermediate horizontal portion 29 of frame 15, as best seen in Figure 3.

Keyed to each of the shafts 28 are a plurality of picking disks 30 which are disposed between the top and bottom walls of the casing sections 14 and which as best seen in Figures 5 and 6, are provided with the teeth 31 which extend entirely around their peripheries. Keyed to the shafts 28 and disposed between the disks 30 are a plurality of disks, certain of which, designated 32 are preferably of a diameter slightly greater than disks 30 while others, designated 33, are of a diameter less than disks 30. The disk 34 is also keyed to each of the shafts 28, preferably adjacent the bottoms thereof, and these disks are preferably of a greater diameter than disks 32, and as best seen in Figure 7 have the undulating peripheries 35 for a purpose which will hereinafter be explained. Each of the sections 14, the shaft 28 journaled therein, and the disks carried thereby constitutes a cotton picking gang and while in some instances a gang may be used separately it is preferred to mount two gangs in vertical spaced apart relationship as illustrated in Figures 5 and 6, and to provide the passage 26 therebetween into which the exposed portions of the disks 30, 32 and 34 may project slightly through the adjacent openings 24 of casing sections 14. The disks 30, 32, 33 and 34 of each gang are held in spaced apart relationship relatively to each other by means of the spacing members 36 which are carried by the shafts 28.

Each of the casing sections 14 is provided with an outlet 37 which is disposed adjacent its back and in spaced apart relationship to its opening 24. The open free ends of the outlets 37, as seen in Figure 5, are connected by the couplings 38 to the bifurcated end of a hose 39 the opposite end of which connects with the suction end of a fan casing 40. A shaft 41 is journaled in and projects outwardly from a side of the casing 40 and is provided with a pulley 42 which is keyed to its exposed end. A power take-off shaft 43 projects outwardly from a side of the tractor 10 and is adapted to be connected to and driven by its motor, not shown, and is likewise provided at its free end with a pulley 44 which is connected to pulley 42 by the endless belt 45 which is trained over these pulleys for driving the shaft 41 from the driving means of the tractor 10. Shaft 41 is adapted to connect with a conventional fan, not shown, mounted in casing 40 for impelling air which is drawn through hose 39 into casing 40 outwardly through the hose or pipe 46 into the basket or container 47 which is mounted on the back end of the tractor 10 and may be of any suitable construction. Mounted on the forward end of the frame 11 and on the outer side of the standard 19 are the bearing blocks 48 in which is journaled a shaft 49 having a pulley 50 keyed to its intermediate portion, between the standards 19 and a sprocket wheel 51 keyed to one of its ends and disposed on the outer side of the frame 11. A pair of arms 52 are pivotally connected at their corresponding ends at 53 to the sides of the frame 15 just above the horizontal portion 29 and are connected adjacent their opposite ends to the shaft 49 on the outer side of the bearings 48 to coact with legs 18 in retaining the frame 15 in substantially a vertical position. Shaft 43 is provided with a second pulley 54 which is connected to the pulley 50 by the endless belt 55 for driving the shaft 49 from the motor of the tractor 10 simultaneously with the suction fan. A shaft 56 extends through the frame 15 and is journaled in the side rails thereof above its horizontal portion 29 and likewise extends through the forward ends of the arms 52, at 53 to pivotally connect said arms to the frame 15. Keyed to one end of the shaft 56 is a sprocket wheel 57 which is connected to the sprocket wheel 51 by an endless chain 58 for driving the shaft 56 from the shaft 49. A pair of corresponding worms 59 are keyed to shaft 56 in spaced apart relationship to each other and between the uprights 21 and are adapted to be connected to the worm gears 60 which are keyed to the shaft 28 for revolving these shafts to drive the two picking gangs in the same direction as indicated by the arrows, in Figure 5.

From the foregoing it will be seen, that the attachment 12 can be so positioned relatively to a row of standing cotton not shown, that as the tractor 10 moves through the cotton field the cotton plants of the row will be successively engaged by the guide fingers 27 and guided thereby into the passage 26. It is to be understood, that the power take-off shaft 43 is being driven by the motor of the tractor 10 so that the fan mounted in casing 40 is being operated thereby and likewise the shafts 28 are being revolved, as heretofore described, to revolve the picking gang including the disks 30, 32, 33 and 34. The plants will move between the fingers 27 until they come in line with the openings 24 of the casing sections 14 at which time the branches of the plants, which had been compressed between the fingers 27 will be released to expand outwardly and partially into the openings 24 to be thereby engaged by the teeth 31 of the cotton picking disks 30. As seen in Figure 5, all of the teeth 31 project in the direction of rotation and constitute fine barbs which are adapted to engage the lint of the open cotton bolls to pull the lint out of the bolls and out of engagement with the plant. Guard disks 32 will engage the limbs of the plant to hold the limbs out of contact with the teeth 31 to prevent them from being injured thereby, while the guard disks 33 prevent the limbs from getting in between the picking disks 30. Guard disks 32 also function to hold the limbs of the plants away from the teeth 31 so that the lint carried by the teeth will not be brushed off by the limbs. The waving peripheries 35 of the agitating disks 34 engage the lower portion of the stalk of the plant to agitate it so that the open bolls will be moved into a position to be contacted by the teeth 31 and to also loosen the lint of the open bolls in the very sturdy plants of the type in which the lint clings more securely to the bolls. The agitating disks 34 also have a further function due to the fact that they are revolving in the same direction and engaging opposite sides of the stalk, in that they tend to twist the stalk to thereby present all of the open bolls to the teeth 31 so that the loose fibrous lint may be readily removed by the picking gangs. By providing the suction means, heretofore described, the lint carried by the teeth 31 is released into the outlets 37 as the teeth move into a communicating position relatively to the outlet passages 37 and this lint is then conveyed through hose 39, casing 40 and pipe 46 into the storage container 47. The suction pipes 37 also have an additional function of drawing the open bolls outwardly so that they will be readily contacted by the teeth 31. This is due to the fact that it is the nature of the cotton plant to release its seeds by either fine barbs or wind which will pull the light fluffy lint out of engagement with the open bolls and this picking device by providing an air current functions to draw the fluffy lint bolls toward the picking teeth to be more readily engaged thereby.

One of the most important advantages of the cotton picker attachment 13 resides in the fact that the disks of both sets of the gangs revolve in the same direction so that there will be no tendency for the plants to be flattened downwardly by engagement with the gangs and this is true even when the machine is standing still and in operation so that the plants will not be injured and will be held upright while the cotton is being picked.

Lever 16 is adapted to be rocked on its pivots 20 for raising and lowering the frame 15 relatively to the frame 11. This is accomplished by compressing the handle portion of latch 22 to release the latch from the bar 23 so that the handle end of the lever 16 may be moved either upwardly or downwardly and fixed in adjusted positions by releasing the latch so that it may be automatically projected into engagement with one of the teeth of bar 23 to thereby hold frame 15 in adjusted position. Both of the casing sections 14 and the picking gangs are carried by the frame 15 and it will be seen that the gangs may thus be adjusted vertically to different elevations depending upon the size of the plant and the condition of the ground over which the attachment 12 is moving. Since the arms 52 are connected to standards 19 and frame 15 at points corresponding to the axes of the sprockets 51 and 57 the movement of frame 15 will not vary the distance between these sprockets so that the tension of chain 58 will not be affected.

Various modifications and changes in the precise construction and arrangement of the parts forming the invention are contemplated and may obviously be resorted to, and the right is therefore expressly reserved to make such variations and changes in the construction and arrangement of the parts forming the invention as do not depart from the spirit and scope thereof as hereinafter defined by the appended claims.

I claim as my invention:

1. A cotton picking machine comprising a casing formed of corresponding sections having openings in their adjacent portions, vertically disposed shafts journaled longitudinally and centrally of said sections, a plurality of disks keyed to each of said shafts and partially projecting through the openings of said sections, the peripheries of said disks being serrated, said casing having a passage extending therethrough and communicating with the openings of said sections, said passage including forwardly extending spaced guide fingers having tapered upper edges tapering toward their forward ends, each of said sections having an outlet remotely disposed relatively to its open side, suction means connected to said outlets, and means for adjustably mounting said casing on a motor vehicle.

2. A cotton picking machine comprising spaced vertically disposed spindles, a plurality of disk shaped picking members keyed to each of said spindles, the peripheries of said picking members being provided with teeth, disks disposed between said picking members and keyed to said spindles, an agitator disk keyed to each of said spindles, adjacent its bottom, and provided with an undulating periphery, and means for driving said spindles to revolve said disks and picking members.

3. A device as in claim 2 comprising a casing provided with a central vertically disposed passage, said casing having corresponding vertically disposed arcuately shaped sections opening into said passage, each of said sections enclosing all but a limited portion of the peripheries of the disks and picking members of one of said spindles, suction means communicating with the intermediate portions of said sections for removing the cotton from the toothed peripheries of said picking members, and means pivotally mounted on a motor vehicle for supporting the cotton picker and for adjusting its elevation.

4. A device as in claim 2 comprising a casing having sections for substantially enclosing said picking members and disks, said casing having a central passage communicating with the adjacent portions of the picking members and disks carried by the two spindles, and means for supporting said casing including a lever for raising and lowering said casing to adjust the elevation of the picking means.

5. A cotton picking machine comprising vertically disposed rotatably mounted shafts, each of said shafts having a plurality of picking elements, a plurality of disks keyed to the shafts and forming guard elements for said picking elements, some of said guard elements being greater in diameter than the picking elements, a fan agitator, casings enclosing said sets of elements and opening toward each other for exposing a limited portion of said elements, suction means communicating with the intermediate portions of said casings and adapted to remove the cotton from said picking elements, and means for adjustably supporting said casings whereby the elevation of said picking elements may be varied.

6. An attachment for use with motor vehicles, said attachment including a frame projecting outwardly from a side of a vehicle and supported thereby, a casing pivotally mounted on said frame and provided with corresponding vertically disposed drum shaped portions opening inwardly, spindles journaled in said portions, cotton picking elements carried by said spindles and partially projecting through the openings in said portions, guide fingers extending forwardly of said casing and adapted to direct cotton plants to the exposed portions of said picking elements, and drive means adapted to connect with the motor of said vehicle for driving said spindles to revolve the picking elements.

7. A device as in claim 6, comprising guard members keyed to said spindles and disposed between said picking elements, and a disk keyed to each of said spindles and provided with an undulating periphery for agitating the cotton plants.

8. A cotton picking machine comprising spaced vertically disposed spindles, means for revolving said spindles in the same direction, a plurality of disks keyed to each of said spindles and provided with toothed peripheries adapted to engage and remove the lint from open cotton bolls of standing cotton plants, guard members keyed to said spindles and disposed between said picking members for holding the branches of the plants out of engagement therewith, and agitating means carried by each of said spindles for turning the plants for exposing all of the open bolls thereof to the picking disks.

9. A cotton picking machine comprising spaced vertically disposed spindles, means for revolving said spindles in the same direction, a plurality of disks keyed to each of said spindles and provided with toothed peripheries for engaging and removing the lint from open cotton bolls of standing cotton plants, and guard members keyed to said spindles and disposed between the picking members for holding the branches of the plants out of engagement therewith.

10. A device as in claim 9, certain of said guard members being greater in diameter than the picking members and the remaining guard members being smaller in diameter than said picking members.

11. A cotton picking machine comprising spaced vertically disposed spindles, means for revolving said spindles in the same direction, a plurality of disks keyed to each of said spindles provided with toothed peripheries for engaging and removing the lint from open cotton bolls of standing cotton plants, and an agitator disk, having an undulating periphery, keyed to each of said spindles for turning the plants for exposing all of the open cotton bolls thereof to the picking disks.

VIRGIL C. BOX.